No. 834,299. PATENTED OCT. 30, 1906.
A. F. HECKEL.
CUTTER HEAD.
APPLICATION FILED JUNE 19, 1906.

WITNESSES:

Albert F. Heckel, INVENTOR

By C. A. Snow & Co.
ATTORNEYS

UNITED STATES PATENT OFFICE.

ALBERT F. HECKEL, OF GALVESTON, TEXAS.

CUTTER-HEAD.

No. 834,299.  Specification of Letters Patent.  Patented Oct. 30, 1906.

Application filed June 19, 1906. Serial No. 322,453.

*To all whom it may concern:*

Be it known that I, ALBERT F. HECKEL, a citizen of the United States, residing at Galveston, in the county of Galveston and State of Texas, have invented a new and useful Circular Saw, of which the following is a specification.

This invention relates to cutter-heads for shaping and dressing jambs; and its object is to provide a compact and durable device of this character which is adjustable, so as to produce door-jambs, pulley-jambs, and various other articles requiring the use of rotatable plow-bits, rabbeting-knives, &c.

A still further object is to combine one or more saws with the cutter-head, so that the completed articles may be cut from the stock during the dressing and shaping operation.

Another object is to provide a saw which is so constructed as to permit the knives on the cutter-head to extend thereinto, and thereby insure the dressing of the stock up to the saw cut.

With the above and other objects in view the invention consists of a rotatable head mounted on a mandrel in any well-known manner, and secured to the mandrel at one end of the head are one or more circular saws having oppositely-disposed parallel slots therein, the slots of all of the saws alining. Dressing-knives are adapted to be secured upon opposite faces of the head, and one end of each knife projects into one set of slots in the saws, so as to insure the dressing of the stock up to or past the saw cut. Knives having cutting edges of any suitable contour for producing grooves, rabbets, &c., are adapted to be fastened to the other faces of the cutter-head.

The invention also consists of certain other novel features of construction and combinations of parts, which will be hereinafter more fully described, and pointed out in the claims.

In the accompanying drawings is shown the preferred form of the invention.

Figure 1:
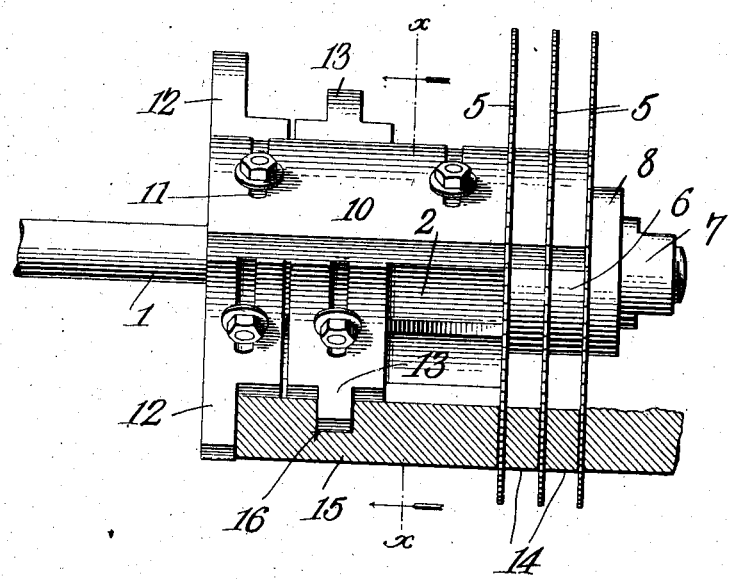
Figure 2:
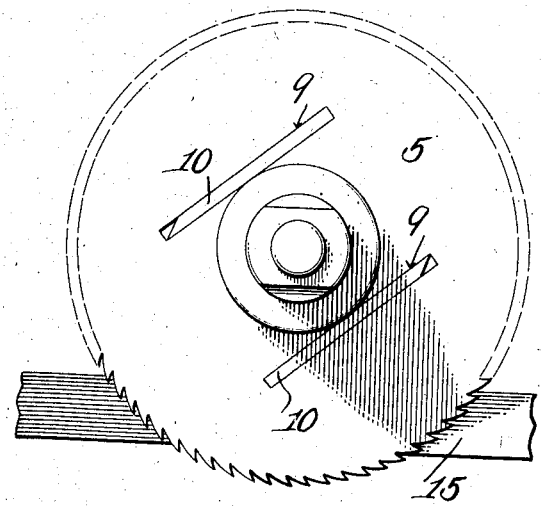
Figure 3:
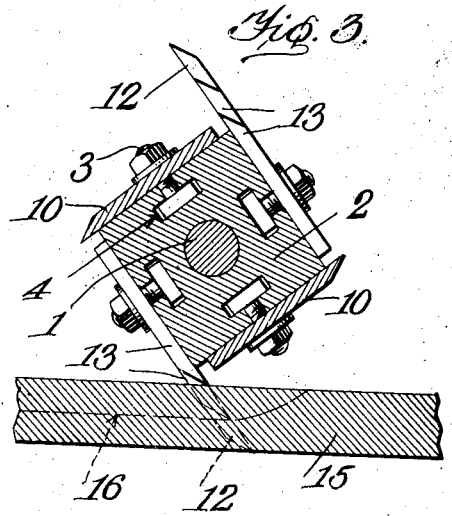

In said drawings, Figure 1 is a front elevation of a cutter-head arranged to produce a dressed pulley-jamb and two parting strips from rough stock at one operation. Fig. 2 is an end view of the device, and Fig. 3 is a section on line *x x*, Fig. 1.

Referring to the figures by characters of reference, 1 is a mandrel of the usual form and on which is disposed a head 2, having securing-bolts 3, adjustably mounted in slots 4, formed in opposite faces of the head. The mandrel extends beyond the head and is adapted to clamp one or more circular saws 5 in position thereagainst. Where a plurality of saws are employed, the same are spaced apart at desired distances by means of washers 6, and a tap 7 is utilized for clamping a ring 8 against the saws, so as to hold them tightly in position upon the mandrel. Each of these saws has two oppositely-disposed parallel slots 9 therein, and when a plurality of saws are employed, as shown in Fig. 1, the slots thereof are placed in alinement. Dressing-knives 10 are adapted to be secured upon opposite faces of the head, and each is adapted to be held in place by means of bolts 3, which extend through slots 11, formed within said knife in the usual manner. One end of the knife is extended through one set of alining slots 9, so that the extremities of said knife will lie flush with the outer face of the outer saw 5. The bolts 3, extending from the other faces of the head, are placed in engagement with cutting-tools, the working edges of which are of any desired contour. Where it is desired to produce a pulley-jamb, an edging-tool 12 is secured to the head, so as to form one edge of the jamb, and a plow-bit 13 is clamped upon the head at a desired distance from the edging-tool for the purpose of producing a groove. Where the cutter-head is arranged to produce a pulley-jamb and spacing-strips, the saws 5 are spaced apart a distance equal to the width of the groove produced by the plow-bit 13.

When the parts have been assembled in the manner described, the head is rotated by means of any suitable mechanism, and rough-dressed stock is fed thereto. The saws 5 will rip the stock, so as to produce two spacing-strips 14, and the dressing-knife 10 will produce a finished outer surface thereon and upon the jamb 15. At the same time the edging-tool 12 will dress one edge of the jamb, while the plow-bit 13 will cut the groove 16, said groove being of the same width as either of the strips 14. It is of course understood that all but one of the saws may be dispensed with, if desired, and in such case two-width stock may be fed to the cutter-head, so that at the first cutting operation a finished jamb will be cut from the stock, after which the remaining rough portion of said stock can be fed to the head and a second jamb produced.

It is also to be understood that various arrangements of the saws and cutting-tools 12 and 13 may be made to produce desired contours. Particular importance, however, is attached to the fact that the saws are formed with slots, so that the dressing-blade 10 can project into the saws and will therefore dress the stock up to the saw cut and without producing any roughened edge or corner.

The preferred form of the invention has been set forth in the foregoing description; but I do not limit myself thereto, as I am aware that modifications may be made therein without departing from the spirit or sacrificing the advantages thereof, and I therefore reserve the right to make such changes as fairly fall within the scope of the claims.

What is claimed is—

1. A device for dressing and shaping jambs and parting-strips, comprising a mandrel, a head rotatable therewith, a plurality of saws secured upon the mandrel and against the head, said saws having registering slots, a dressing-knife adjustably secured upon the head, one end of said knife extending into the saws, and edge and groove cutting tools adjustably secured to and rotatable with the head.

2. The combination with a rotatable head; of a plurality of saws rotatable with the head and having alining slots, and a cutting-tool secured upon the head and projecting through one of the slotted saws and into the slot of the other saw.

3. The combination with a rotatable head; of a saw secured thereto and having a slot formed tangentially therein, said slot being of uniform width and having closed ends, and a cutting-tool secured upon the head, one side edge of said tool and one end of its cutting edge fitting snugly within the slot, said slot being of the same width and length as the thickness and length of the cutting-tool.

In testimony that I claim the foregoing as my own I have hereto affixed my signature in the presence of two witnesses.

ALBERT F. HECKEL.

Witnesses:
O. A. SOETEN,
M. P. CUENOD.